United States Patent [19]
Tseeng

[11] Patent Number: 5,899,506
[45] Date of Patent: May 4, 1999

[54] CONFINING RING SET SUITING WIDER RANGE OF DIAMETER OF PIPES

[76] Inventor: Shao-Chien Tseeng, No. 130, Sec. 2, Yang-Shin Rd., Yang-Mei, Taoyuan 326, Taiwan

[21] Appl. No.: 08/926,742

[22] Filed: Sep. 10, 1997

[51] Int. Cl.[6] .................................................. F16L 55/00
[52] U.S. Cl. .................... 285/148.23; 285/114; 285/298; 285/404; 285/419; 285/420; 403/362
[58] Field of Search ...................... 285/148.23, FOR 159, 285/404, 420, 298, 114, 419; 403/362, 373, 354, 204

[56] References Cited

U.S. PATENT DOCUMENTS

| | | | |
|---|---|---|---|
| 2,118,067 | 5/1938 | Brown | 285/148.23 X |
| 2,328,381 | 8/1943 | Jaffe | 285/148.23 X |
| 2,472,307 | 6/1949 | Nagel | 285/404 X |
| 2,702,716 | 2/1955 | Basolo et al. | 285/420 X |
| 4,819,974 | 4/1989 | Zeidler | 285/404 X |

Primary Examiner—Dave W. Arola
Attorney, Agent, or Firm—Pro-Techtor International Services

[57] ABSTRACT

A confining ring set suiting wider range of diameters of pipes, wherein a "C" shaped confining ring is provided at three locations thereon with three screw holes equidistantly spaced with one another, each screw hole is provided with a screw therein pointing at the center of a chamber of the confining ring, the chamber is fitted therein with an external annulus which in turn is fitted therein with an inner annulus; the external and inner annuli have "C" shaped openings, an internally extended annular rib is provided on the top of the inner annulus, and an externally extended annular rib is provided on the top of the external annulus, the annular ribs are both provided with notches thereon to scatter stress, the confining ring set having the external and inner annuli can be used to confine pipes of a wider range of diameters, for the smaller pipes, three screws on ring set and effect of confining can thus be increased. The confining ring can further contract the external and inner annuli to transform the confining force in point contact mode into surface contact mode through the annuli, thus can effectively contract the smaller pipes, the range of diameter of pipes available for the confining.

4 Claims, 3 Drawing Sheets

CONFINING RING SET SUITING WIDER RANGE OF DIAMETER OF PIPES

BACKGROUND OF THE INVENTION

1. Field of the Invention

The present invention is related to a confining ring set suiting wider range of diameter of pipes, and especially the common pipes connected with each other coaxially, including straight pipes or tapered pipes of various diameters telescopically connected mutually, so that a confining ring set of the present invention can be fitted directly over the external wall of an exterior pipe of which the diameter can be various.

2. Description of the Prior Art

Common pipes connectable with each other coaxially seen in the markets nowadays include those such as posts for bicycles, pipes for taps, stretchable pipes for flag poles, stretchable pipes for umbrellas and stretchable connecting pipes for fishing nets etc.; normally an inner as well as an outer pipe connectable with each other coaxially are loosely placed together, every connecting area on these inner as well as outer pipes is provided with a confining device, so that when the inner and outer pipes are telescopically adjusted to a desired length or height, the confining device can fixedly confine the inner and outer pipes in positions.

However, confining devices used for pipes connected with each other coaxially can be seen in the techniques used in the arts, the disadvantages thereof are now described below:

1) As to those which lock pipes for positioning through contact of a plurality of points: normally a screw or more than one screws are used to contact an exterior pipe at a connection of the pipes, and are threadedly feeded, then the screw ends press directly the exterior wall of an interior pipe, thereby tight clamping for fixed positioning of the interior pipe by contact of one or a plurality of points can be effected; conventional articles use such way for clamping tight can be seen normally on stretchable pipes for flag poles wherein the exterior pipes have thick walls or on stretchable pipes for umbrellas having less load; locking by one point contact can be enhanced by increasing screws to form a three point contact mode to achieve circumferential confining, however, point contact can not effectively confine the interior pipe which is full of stress at every part of the whole periphery thereof, the articles such as stretchable pipes for flag poles have very long length and very heavy weight, they also bear external forces such as wind force, the force of gravity or other component forces, the moment formed on such long pipes may induce very large and non-directional stress at the connection of the pipes, therefore, clamping by screws for fixed positioning of an interior pipe by contact of points can not deal with all the equalized stress on the peripheral wall of the interior pipe at the connection, this is the reason why the pipes are subjected to loosening.

2) As to those which lock pipes for positioning through surface contact: normally a "C" shaped confining ring is used, screws are provided on the wall portions at both sides of the opening of the "C" shaped confining ring for reducing the diameter of the confining ring and thus contracting the exterior wall of the exterior pipe, so that the exterior wall of the interior pipe is clamped tight for fixed positioning thereof; conventional articles use such way for clamping tight can be seen normally on posts for bicycles and pipes for taps; the wall of a "C" shaped confining ring has a confining area which is almost equal to the peripheral area of an imaginary similar ring without an opening and thus can form friction drag with the exterior wall of the interior pipe with a relatively larger contact area, so that the interior pipe can be effectively tightly confined; however, the "C" shaped confining ring itself only has a limited confining range, and the curvature created in confining is not truly round, therefore, its confining action force in clamping the interior pipe through the exterior pipe is not uniformly distributed in the whole periphery of the interior pipe, a problem of unability of effective confining thus exists; if a post for a bicycle or a pipe for a tap wherein a confining ring has to bear the weight of a man and vibration during riding or pressing of an arm of a man can not get an effective confining function for a long period, loosening at the connection of the pipes will induce accidental hurt or inconvenience sooner or later.

The above stated two conventional measures of locking or confining are not able to effectively get the function of confining a connection of an interior and an exterior pipe; and although confining effect obtained by surface contact can be better than that obtained by point contact, in addition to not exactly round surface contact, conventional confining rings have the defect of limited confining range, so that confining rings of single diameter gauge are not good enough for use with pipes of various diameters to be assembled and confined, practicality thereof thus is relatively low. This may be seen on a post for a bicycle or a pipe for a tap, exterior pipes in the markets are of the gauge of diameter of $\phi 25.4$–$31.8$ mm, such range is out of the limited range of confining, hence manufacturers must make products of various sizes for application, this increases quite much cost, the invention is an improvement directing to these problems and inconvenience.

SUMMARY OF THE INVENTION

The primary object of the present invention is therefore to provide a confining ring set suiting wider range of diameters of pipes, the confining ring set includes an inner and an external annulus, so that when in confining, friction drag between the annuli can be provided, while the maximum stationary friction drag between the interior and exterior pipes and thus confining effect can be increased, the confining ring is then capable of confining the pipes within a wider limiting range.

Another object of the present invention is to provide a "C" shaped inner and a "C" shaped external annulus, the width of the openings thereof are larger than that of the confining ring itself, three screws are screwed on at three locations on the confining ring and equidistantly spaced with one another, the three screws which have the best securing capability press the exterior wall of the external annulus, thereby contract the confining ring to its extremity of limitation of confining range, the three screws further press and confine the inner and the external annuli, the point contact of the three screws then is converted into contracting force in the mode of surface contact of the external and the inner annuli, the diameters of the pipes are thus reduced.

Another object of the present invention is to provide an internally extended annular rib on the top of the inner annulus and to provide an externally extended annular rib on the top of the external annulus, the internally and externally extended annular ribs are both provided with notches thereon to scatter stress, this can prevent the inner and the external annuli from being damaged due to concentration of stress induced by overly large bending moment, the screws are fed by suitable degree of rotation, the inner and the external annuli both can bear pressure for the desired bending curvature to be obtained in confining, and can even have a contacting surface area which almost equal to the periphery of a true round, and hence the pipes can have the closest contact and the best confining effect therebetween.

A further object of the present invention is to use the confining ring with the inner and the external annuli therein on telescopically connected pipes, wherein, the internally extended annular rib of the inner annulus covers the wall of the exterior pipe, and the externally extended annular rib on the top of the external annulus covers the wall of the confining ring, so that bracing, dust-proof and water-proof functions can be effected when in confining.

Another object of the present invention is to use the confining ring set on the connected pipes of same diameter, wherein, the inner annulus having the internally extended annular rib is removed and only the external annulus having on the inner wall thereof neat contacting and confining surface is used, the pipes of same diameter therefore can be confined to be firmly connected with each other.

The present invention will be apparent in its practical structure, functions and the above objects after reading the detailed description of the preferred embodiment thereof in reference to the accompanying drawings.

DETAILED DESCRIPTION OF THE PREFERRED EMBODIMENT

Figure 1:
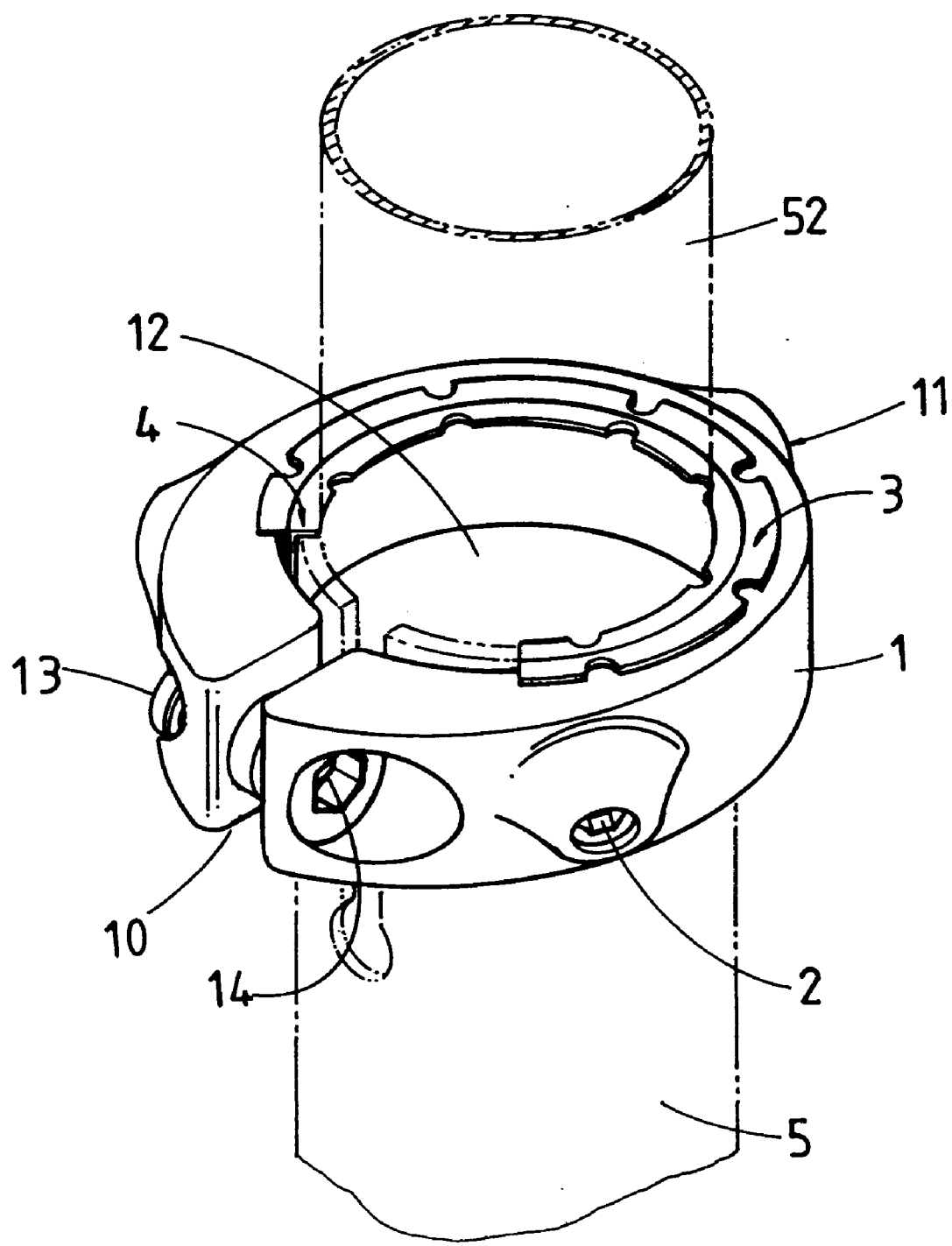
FIG. 1 is a perspective view of the present invention after being assembled.
Figure 2:
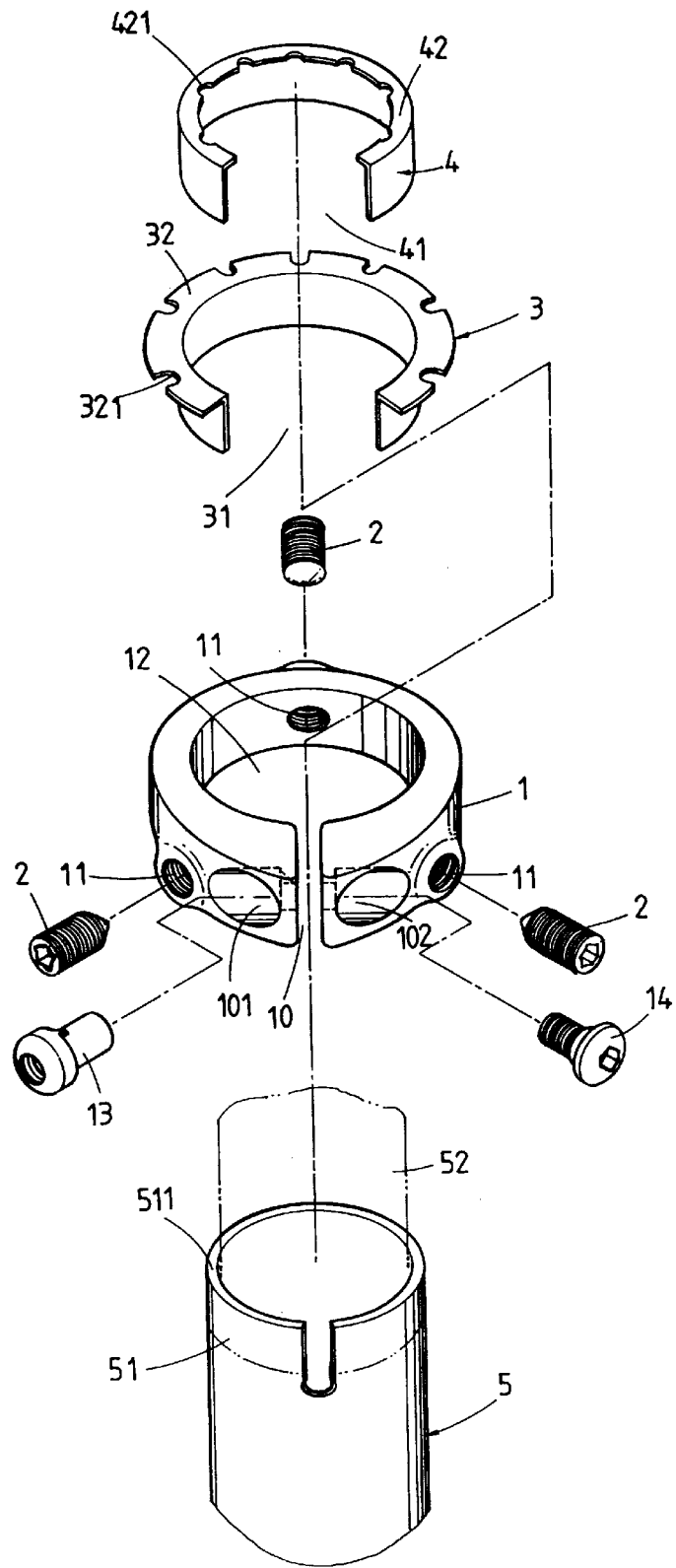
FIG. 2 is an analytic perspective view of the present invention.

Referring firstly to FIG. 1 and 2 of the drawings, the confining ring set of the present invention is comprised mainly of a "C" shaped confining ring 1 provided at three locations thereon with three screw holes 11 equidistantly spaced with one another (i.e., the angular distance between every two holes is 120 degrees), the three screw holes 11 each is provided with a screw 2 therein pointing at the center of a chamber 12 of the confining ring 1, the chamber 12 is fitted therein with an external annulus 3 which in turn is fitted therein with an inner annulus 4, the "C" shaped confining ring 1 with the external annulus 3 and the inner annulus 4 can be fitted over a connection 51 at the pipe end on an exterior pipe 5 for confining tight an interior pipe 52 loosely fitted in the exterior pipe 5. Wherein:

The "C" shaped confining ring 1 has an opening 10 of which the two ends are provided respectively with a nut hole 101 and a bolt hole 102 for receiving therein respectively a nut 13 and a bolt 14 for threaded connection thereof, therefore, the diameter of the chamber 12 of the confining ring 1 is gradually contracted, the bolts 14 in this embodiment are those having inner hexagonal bores therein on the top heads thereof, in practice, fast disassemblable bolts will also do;

The external annulus 3 and the inner annulus 4 can be made of stainless steel or spring steel or the like and are in the form of "C" shaped thin annular sheets having openings 41, 31, the width of the openings 41, 31 are larger than that of the opening 10 of the confining ring 1, so that the thinner external annulus 3 and inner annulus 4 have wider confining range than the thicker "C" shaped confining ring 1 comparatively; an internally extended annular rib 42 is provided on the top of the inner annulus 4, and an externally extended annular rib 32 is provided on the top of the external annulus 3, the internally and externally extended annular ribs 42, 32 are both provided with notches 421, 321 thereon to scatter stress, so that when the external annulus 3 and the inner annulus 4 sustain the confining or pressure of the confining ring 1 or the screws 2, these notches 421, 321 are used to scatter stress to render the pipes 5, 52 to deform into a uniform bending curvature, the confining force thereby is uniformly distributed on the peripheries of the pipes 5, 52; moreover, the externally extended annular rib 32 on the top of the external annulus 3 covers the wall of the confining ring 1 to give bracing and to prevent the external annulus 3 from dropping both before and after confining operation, and the internally extended annular rib 42 of the inner annulus 4 covers the wall 511 of the exterior pipe 5 to similarly prevent the inner annulus 4 from dropping both before and after confining operation.

Figure 3:
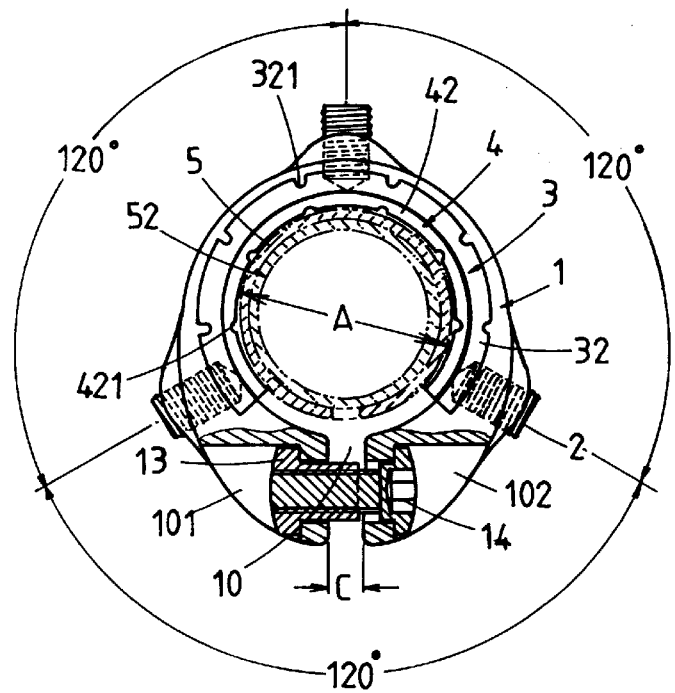
FIG. 3 is a top view showing the present invention in confining pipes with larger diameters.

As shown in FIG. 3, when the diameter A of the exterior pipe 5 to be confined as shown is no less than the minimum size that allows confining of the confining ring 1 within the range of width C for confining, the diameter of the chamber 12 of the confining ring 1 can thereby be contracted with the bolts 14 gradually to distribute the confining force uniformly on the peripheries of the exterior pipe 5 in the confining ring 1 through surface contact between the confining ring 1 and the exterior pipe 5 at the connection 51, the confining force also exerts uniformly on the peripheries of the interior pipe 52 to get the best tight confining effect. If it is found that the contact areas of the inner annulus 4 and the exterior pipe 5 are not of the contact of true rounds, the screws 2 nearby can be further screwed tight to render the nontrue round contact areas to get even closer contact, a true round contact can then be effected, and uniform distributing of the confining force thus is effected too.

Figure 4:
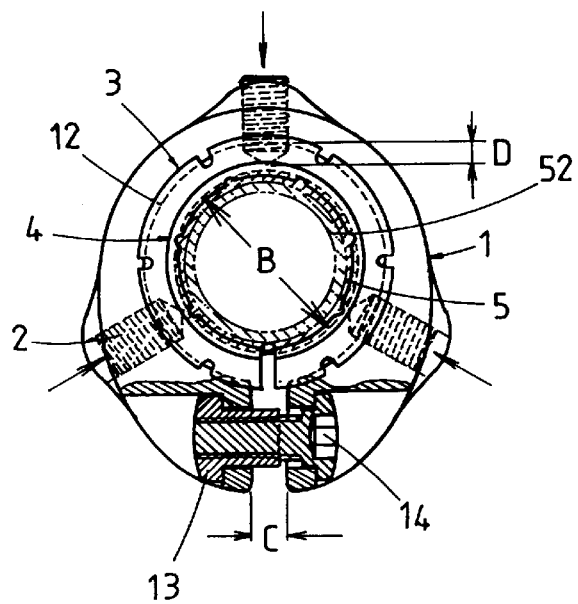
FIG. 4 is a top view showing the present invention in confining pipes with smaller diameters.

Referring to FIG. 4, when the diameter B of the exterior pipe 5 to be confined as shown is less than the minimum size that allows confining of the confining ring 1 within the range of width C for confining, the wall of the inner annulus 4 can no more be confined by the confining ring 1, at this time, the openings 41, 31 of the inner and the external annuli 4, 3 are still capable of being further confined by the screws 2 on the confining ring 1 to an amount of D to press the external annulus 3, after the action force by point contact of the screws 2 is scattered on the periphery of the external annulus 3, the confining force is transferred through friction drag to the periphery of the inner annulus 4 uniformly, thereby, the wall of the inner annulus 4 is gradually contracted to close to the exterior pipe 5 at the connection 51 on the wall of the latter in a surface contact mode, the confining force thus is uniformly distributed to the interior pipe 52, this can also get the best tight confining effect.

According to the above statement, it is clear that the present invention uses a confining ring set of only one gauge to fit wider range of diameters of pipes connected with each other coaxially and telescopically and to achieve the best tight confining effect in a surface contact mode.

Having now particularly described and ascertained the technical structure of my invention with practicability and improveness of my said invention and in what manner the same is to be performed, what we claim will be declared in the claims followed:

What is claimed is:

1. A pipe confining ring set to secure an interior pipe in an exterior pipe, said ring set, to tightly secure an interior pipe in an exterior pipe, the pipes being connected coaxially and telescopically, and said ring set being further capable of accommodating a wide range of pipe diameters, said ring set comprising:

a C-shaped confining ring with a plurality of threaded holes equidistantly spaced on an exterior of said confining ring, each of said threaded holes is provided with a securing screw means, a longitudinal axis of each of said threaded holes is orthogonal to a longitudinal axis of the pipes, a contracting means to contract an opening in said confining ring, a C-shaped outer annulus nested within said confining ring, said outer annulus includes an outward extending annular rib, said outward extending annular rib includes a plurality of notches to relieve stress from a contracting operation, and a C-shaped inner annulus nested within said outer annulus, said inner annulus includes an inward extending annular rib, said inward extending annular rib includes a plurality of notches; such that said contracting means are tightened to reduce a width of said opening in said confining ring, said screw means thereby contacting said outer annulus and said inner annulus, said annuli thereby spreading a contracting force about the perimeters of said annuli and the pipes so that said contracting force secures the inner pipe in position relative to the outer pipe.

2. The confining ring set as defined in claim 1 wherein:

widths of openings in said outer annulus and said inner annulus are larger than that of said width of said opening of said confining ring, so that said outer and said inner annuli have a wider range of contraction than said confining ring.

3. The confining ring set as defined in claim 1 wherein:

said outward extended annular rib of said outer annulus covers a wall of said confining ring.

4. The confining ring set as defined in claim 1 wherein:

said inward extended annular rib of said inner annulus covers a wall of said exterior pipe.

\* \* \* \* \*